(12) United States Patent
Gruber et al.

(10) Patent No.: US 8,575,924 B2
(45) Date of Patent: Nov. 5, 2013

(54) MAGNETIC FIELD SENSOR ELEMENT

(75) Inventors: Jürgen Gruber, Königstein (DE); Manfred Goll, Glauburg (DE); Martin Watzlawik, I, Maintal (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 263 days.

(21) Appl. No.: 12/747,309

(22) PCT Filed: Dec. 9, 2008

(86) PCT No.: PCT/EP2008/067135
§ 371 (c)(1),
(2), (4) Date: Jun. 10, 2010

(87) PCT Pub. No.: WO2009/074582
PCT Pub. Date: Jun. 18, 2009

(65) Prior Publication Data
US 2010/0271015 A1    Oct. 28, 2010

(30) Foreign Application Priority Data
Dec. 13, 2007  (DE) .......................... 10 2007 060 604

(51) Int. Cl.
*G01R 33/06* (2006.01)

(52) U.S. Cl.
USPC ......................................... 324/244; 324/173

(58) Field of Classification Search
USPC .................................................. 324/244, 173
See application file for complete search history.

(56) References Cited

U.S. PATENT DOCUMENTS

| 5,963,028 | A  | * | 10/1999 | Engel et al. ................ 324/207.2 |
| 6,056,909 | A  |   | 5/2000  | Wehling et al. |
| 6,265,865 | B1 | * | 7/2001  | Engel et al. ................ 324/207.2 |
| 6,590,776 | B2 | * | 7/2003  | Karino et al. ................ 361/728 |
| 7,269,992 | B2 |   | 9/2007  | Lamb et al. |
| 2003/0084862 | A1 |   | 5/2003  | Pachmann et al. |
| 2006/0042074 | A1 |   | 3/2006  | Stork et al. |

FOREIGN PATENT DOCUMENTS

| DE | 100 23 622 A1     | 11/2001 |
| DE | 102 12 483 A1     | 10/2003 |
| DE | 10 2004 035 284 A1 | 2/2006 |
| DE | 10 2005 035 881 A1 | 3/2006 |
| DE | 10 2006 030 132 A1 | 1/2007 |
| DE | 10 2006 030 081 A1 | 2/2007 |
| DE | 10 2006 030 133 A1 | 2/2007 |
| EP | 0 340 418 A2      | 11/1989 |
| EP | 0 804 329 B1      | 11/1997 |
| EP | 1 262 779 A2      | 12/2002 |
| EP | 1 310 634 A2      | 5/2003  |
| EP | 1 662 262 A1      | 5/2006  |
| EP | 1 837 886 A1      | 9/2007  |
| JP | 2006-275639       | 10/2006 |
| WO | WO 2006/100143 A1 | 9/2006  |

* cited by examiner

*Primary Examiner* — Reena Aurora
(74) *Attorney, Agent, or Firm* — RatnerPrestia

(57) ABSTRACT

A sensor unit with at least one magnetic field sensor element, at least one application specific integrated circuit (ASIC) and at least one magnet are arranged in a capsule housing on at least one leadframe. The capsule housing is surrounded by a sensor encapsulation and is intended to have smaller dimensions so as to allow it to be positioned in the encapsulating mold with less effort and at the same time in the exact position. For this purpose, it is provided that the capsule housing has a number of fixing aids adapted in their outer dimensions to an injection mold assigned to the sensor encapsulation.

14 Claims, 5 Drawing Sheets

MAGNETIC FIELD SENSOR ELEMENT

CROSS REFERENCE TO RELATED APPLICATIONS

This application is the U.S. national phase application of PCT International Application No. PCT/EP2008/067135, filed Dec. 9, 2008, which claims priority to German Patent Application No. 10 2007 060 604.6, filed Dec. 13, 2007, the contents of such applications being incorporated by reference herein.

FIELD OF THE INVENTION

The invention relates to a sensor element with at least one Application Specific Integrated Circuit (ASIC) and at least one magnet on at least one leadframe, all the elements being arranged in a capsule housing that is surrounded by a sensor encapsulation.

BACKGROUND OF THE INVENTION

One of the application areas for magnetic field sensor elements is, for example, that of motor vehicles. Among their tasks in this area is use in air springs for determining the level of the vehicle in a level measuring device. DE 100 23 622 B4, which is incorporated by reference, describes in this respect the use of the magnetic field strength of a permanent magnet, sensed by a magnetic field sensor element, for level determination.

Similarly, magnetic field sensor elements may be used for controlling a reciprocating-piston internal combustion engine, such as that typically used in a motor vehicle. DE 10 2005 035 881 A1 and EP 1 310 634, which are incorporated by reference, show the use of magnetic field sensor elements for sensing the rotational angular position of a camshaft, from which the necessary values for adjusting the camshaft in relation to the crankshaft can be calculated.

Magnetic field sensors may also be used for sensing the surroundings of the motor vehicle as a component part of a safety device. In this case, items of image information, such as those described in DE 102 12 483 A1, which is incorporated by reference, from the surroundings of the motor vehicle, for example of stationary and/or movable objects and/or road users, are recorded and assessed, the assessment possibly leading to triggering of one or more airbags, dependent on the seating occupancy in the motor vehicle. Coupling with a parking system is also possible.

Magnetic field sensor elements are used, for example, for determining the wheel speed, that is to say the rotational speed of a wheel. These are known as wheel speed sensors.

The speed determination typically takes place by using three elements:
 a sensor with a sensor head
 a magnetic track (encoder)
 an air gap between the two hardware elements.

As a result of the way in which they are designed, magnetic field sensor elements have only a small range. Therefore, to function well, they should be positioned as close as possible to the recording magnetic track, known as the encoder.

Wheel speed sensors usually operate with two different types of encoder:

Ferromagnetic Encoder

The ferromagnetic encoder influences the magnetic field that is generated by the magnet of the sensor element.

Magnetic Encoder

The magnetic encoder generates its own magnetic field. It typically consists of elastomer with a so-called filler comprising a ferrite content of 20%.

The advantages of a magnetized encoder are that it can be easily integrated in other mechanical components and/or sub-assemblies, preferably in the seal of the wheel bearing. It can, however, also assume an additional, independent function as a seal of the wheel bearing. On account of their technology, the sensor elements for the magnetized encoder require little space, and therefore make a particularly small sensor head possible.

There are known wheel speed sensors that have their housed magnetic field sensor elements, that is to say bridges, dies, ASICs, magnets or leadframes, encapsulated in epoxy, and for positionally exact positioning have to be fitted in prefabricated plastic or plastic-metal inserts known as carriers, or in a so-called pre-molds performing the task of pre-encapsulation.

These carriers or pre-molds are held in the encapsulating mold exactly in position for the sensor unit with the magnetic field sensor and (read head), in order to ensure the positional exactness of the sensor element during the encapsulation to form the finished sensor. The necessary sealing of the sensors in the region of the carrier holding points is achieved here by the plastics material bonding for the encapsulation of the sensor unit as well as by the forming of a number of melt ribs at the holding points.

SUMMARY OF THE INVENTION

The invention relates to providing a prefabricated magnetic field sensor element of the stated type which, with smaller dimensions, can be positioned in the encapsulating mold with less effort and at the same time in the exact position.

An object of the present invention is achieved according to aspects of the invention by the capsule housing having a number of fixing aids adapted in their outer dimensions to an injection mold assigned to the sensor encapsulation.

The invention is based on the idea that, for the final encapsulation of the sensor element, it is necessary to have fixing aids which ensure the exact position of the sensor element by supporting themselves in the mold of the final sensor encapsulation.

In order to achieve production at the lowest possible cost, it is intended to dispense with unnecessary intermediate production steps or components for positioning the housed sensor element. A standard component such as the carrier used for positionally exact positioning can be replaced by the complete sensor unit being fixed in the encapsulating mold in that a number of fixing aids, which comprise at least one sealing component for the final encapsulation, advantageously being arranged on the capsule housing.

In order that a standard component without arranged fixing aids can be used in the production for the sensor unit, whereby the costs incurred can be lowered, said fixing aids are advantageously subsequently placed on or adhesively attached to the capsule housing in the manner of pairs of shells.

To allow a standard component to be used for the sensor unit, and consequently to allow costs to be saved and/or not to be tied to a predetermined design of the housed sensor element in the possible event of problems in terms of space, the fixing aids are advantageously not arranged on the capsule housing itself but on the leadframe connected to the capsule housing.

In order to increase the service life of the cable connection between the magnetic field sensor element and the assigned electronics in the motor vehicle and, to the greatest extent, avoid loading of the contacts by tensile loading, for example during maintenance work or as a result of external influences in road traffic, as well as to provide alternative fixing for the encapsulation, the leadframe and/or the cable for the connection of the sensor connector pin advantageously comprises a tension relief, it being possible for this also to be a fixing aid that is formed as a tension relief.

In order that a sealed connection can be achieved between the coating of the capsule housing and the later encapsulating compound of the capsule housing, and that no moisture penetrates at the contact surfaces, the same material is advantageously provided for the coating of the capsule housing and for the sensor encapsulation, this material expediently being polyamide (PA), polyurethane (PU) or PBT.

The advantages achieved with the invention are, in particular, that the capsule housing is positioned by the integrated positioning aids directly and in the exact position without further auxiliary means, which could comprise additional components and/or supporting elements on the mold, or any corresponding intermediate encapsulation in the sensor encapsulating mold, and consequently a sensor with smaller dimensions can be used. Furthermore, the integrated positioning aids provide good preconditions for sealing of the sensor, since it is completely sealed by the encapsulation, and the contacting area of the encapsulated sensor unit with the mold contour of the outer encapsulation is particularly small. Therefore, no external protection against moisture and/or dirt is necessary. Servicing and/or maintenance work as well as exchange or removal of the wheel bearing are also possible.

BRIEF DESCRIPTION OF THE DRAWINGS

The invention is best understood from the following detailed description when read in connection with the accompanying drawings. Included in the drawings is the following figures.

The same parts are provided with the same designations in all the figures.

DETAILED DESCRIPTION OF THE PREFERRED EMBODIMENTS

Figure 1A:
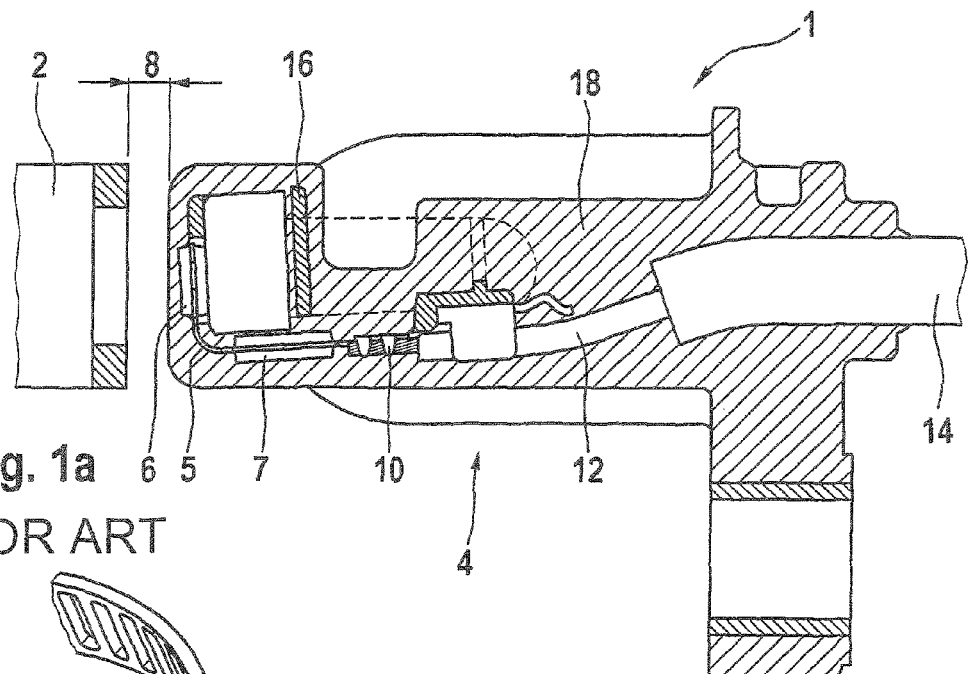
FIGS. 1a)-1c) shows the construction of a wheel speed sensor and sensor head of a conventional type in different, schematic views.

FIGS. 1a) to c) schematically show, by way of example, a wheel speed sensor system 1 of a conventional type of design from various views. Between the encoder 2, which may be configured as a magnetized encoder or as a ferromagnetic encoder, and the sensor head 4 with the sensor unit 5, which comprises the magnetic field sensor element 6 (read head) and the application specific integrated circuit(ASIC) 7, there is an air gap 8. Since the sensor unit 6 has only a limited range, it should be positioned as close as possible to the magnetic track, that is to say the encoder 2.

In FIG. 1a), a sensor head 4 of a standard type of design is represented as an example. It comprises the sensor unit 5 with a magnetic field sensor element 6, a number of electrical conductors 12 from/to the magnetic field sensor element 6, which are led out from the sensor head 4 in a protective sheathing 14, and a carrier 16, which is intended to ensure the positionally exact positioning of the magnetic field sensor element 6 in the sensor head 4.

The electrical conductors 12, which are usually led out as cables, are connected to the carrier 16, for example by means of crimp contacts 10. As a result, tension relief is achieved, since no forces can act on the sensor unit 5 even when the electrical conductors 12 led out from the sensor head 4 are subjected to tensile loading, for example during servicing work and/or exchange, but instead these forces are already intercepted at the carrier 16.

The sensor unit 5 with the magnetic field sensor element 6, the carrier 16 and the number of electrical conductors 12 are surrounded by an encapsulation 18, which serves for protecting the sensor head 4 and the sensor unit 5 from moisture and dirt.

Figure 2:
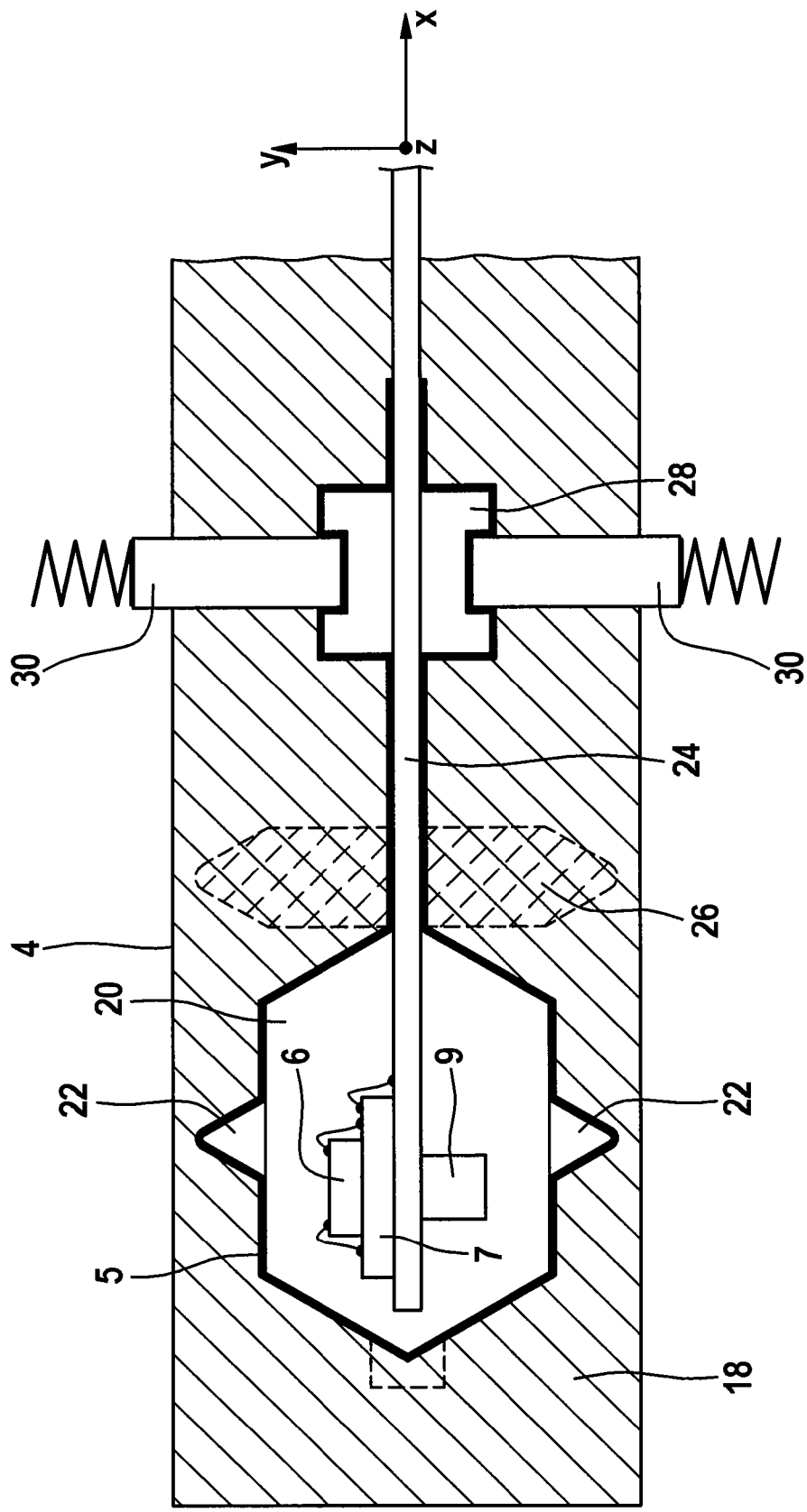
FIG. 2 shows the sensor element (according to aspects of the invention) with positioning aids in section.

During the injection of the enclosing material into the mold for the encapsulation of the sensor unit 5, it is important to take care that the sensor unit 5 is positioned exactly in the sensor head 4. As FIG. 2 shows, the sensor head 4 is fastened to the carrier 16. However, the carrier 16 also requires a positioning aid in the mold for the encapsulation 18, in order to ensure the positional exactness of the sensor unit 5 in relation to the encoder 2. For this purpose, according to the current state of the art, the carrier 16 is held by means of pins 19 for the duration of the encapsulation. These pins 19 are withdrawn after encapsulation has taken place.

Figure 1B:
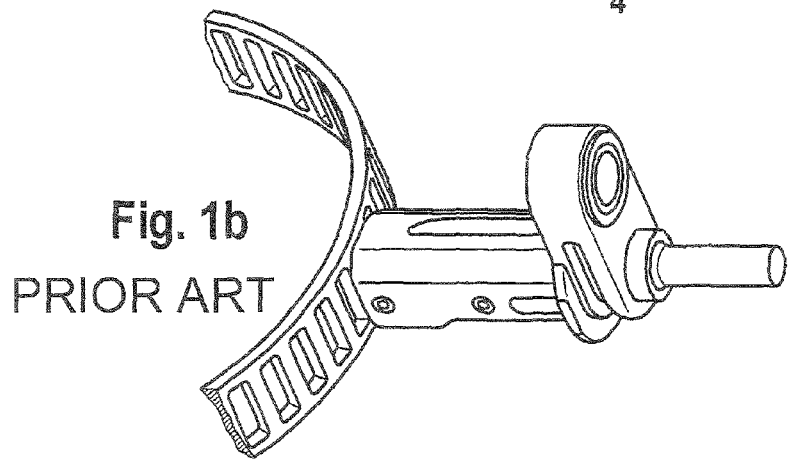
Figure 1C:
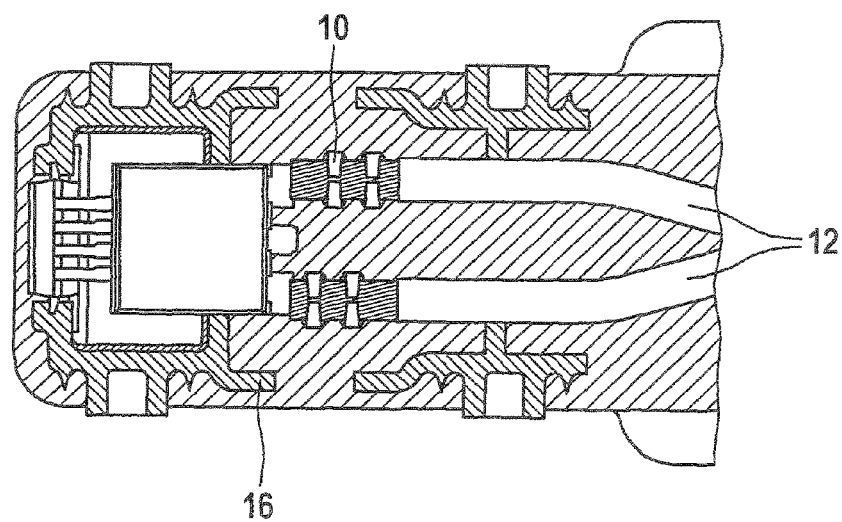

FIG. 2 illustrates how the sensor unit 5 can be positioned in the sensor head 4. However, by contrast with the prior-art versions that are represented in FIGS. 1 a) to c), the sensor head 4 is already the version according to aspects of the invention with a magnetic field sensor element 6 and an ASIC 7 integrated in the sensor head 4.

The sensor unit 5 is in a capsule housing 20 and usually comprises a number of sensor elements, ASICs, leadframes, magnets and, for certain applications, capacitors, this capsule housing 20 being positioned exactly in the sensor head 4 in order to set the distance between the encoder 2 (not represented here) and the magnetic field sensor 6 (read head) of the sensor unit 5 as optimally as possible for reading. For this purpose, fixing aids 22 are provided on the housing 20. These fixing aids may be molded onto the capsule housing 20, that is to say provided in the same method step as the production of the housing 20.

Alternatively, the fixing aids 22 may be adhesively attached to the housing 20 as a separate housing part, in the manner of pairs of shells, or be provided as an insert in the injection mold for the encapsulation of the sensor unit 5.

In order to achieve sealing of the encapsulation 18 from external influences during the operation of a motor vehicle, the capsule housing 20 with arranged fixing aids 22 should be coated with a suitable material, for example with PU. This is so since the capsule housing 20 usually consists of epoxy resin, so that later encapsulation requires coating of the capsule housing 20 in order to achieve sealing between the capsule housing 20 and the encapsulation 18 consisting of thermoplastic material. This coating should preferably be of the same material or a softer material than the later encapsulation 18, in order that a kind of fusion can be achieved between the two materials.

Furthermore, the encapsulation 18 should enclose the fixing aids 22 with an amount of play of at most $2/10$ mm between the outer end of the fixing aids 22 and the delimitation of the encapsulation 18 or a very small oversize of the encapsulation 18 with respect to the fixing aids 22, that is to say with elastic deformation of the fixing aids 22, in such a way that pressure exertion and/or pressing of the sensor unit 5 is avoided when the encapsulating mold is closed. For this purpose, a conical, outwardly tapering shape of the fixing aids 22 may also be provided, so that the outward contact locations are also kept as small as possible. This is so since hard pressing could otherwise damage or destroy sensitive electronics inside the encapsulation.

Furthermore, with an amount of play between the fixing aids 22 and the encapsulating mold it is ensured that complete encapsulation, including of the fixing aids 22, is secured at least on one side of the capsule housing 20, and sealing, for example against moisture penetration, is achieved at this location by the encapsulation 18.

On the opposite side, the fixing aid 22 could be pressed against the wall of the mold by the encapsulating material that is led into the mold under pressure during the encapsulating operation, whereby contact with the mold, and consequently a leakage point, may occur at this location. Therefore, coating is likewise advantageous for such a case.

Suitable methods for ensuring sealing of the later component as a whole by means of coating of the capsule housing 20 may be:
  coating with PU (polyurethane) by dipping or spraying,
  mounting of PU shells or in the form of a tube, or
  mounting as a mesh, neither of the variants of the use of PU shells being represented here, or
  use of the material used later for the encapsulation 18 of the sensor unit 5 as coating material instead of PU, for example polyamide.

Alternatively, or in addition to the fixing aids 22 arranged on the capsule housing 20, a fixing aid 26 may also be arranged on the leadframe 24. This fixing aid 26 may be provided as a finished component or may be molded on, adhesively attached or clamped on. For this purpose, it may, for example, be pushed on from the side. As a result of the arrangement of the fixing aid 26 on the leadframe 24, a low-cost standard encapsulation could be chosen for the capsule housing 20, even if it is does not have the fixing aids 22 arranged on the capsule housing 20. Since the leadframe 24 is fixedly connected to the capsule housing 20 of the sensor unit 5, the fixing aid 26 satisfies the preconditions that are required for positionally exact positioning of the sensor unit 5 in the sensor head 4.

Furthermore, a fixing aid 28 on the leadframe 24 is conceivable. This may likewise be arranged on the leadframe 24 by molding on, adhesive attachment or clamping on. The geometrical form of the fixing aids 28 satisfies two requirements: it is formed in such a way that it has receptacles for mold pins 30 and it is held by means of these mold pins 30 exactly in position for the encapsulating operation. The mold pins 30 are withdrawn again after the encapsulating operation has taken place.

Furthermore, after the external encapsulation has taken place, the fixing aid 28 ensures tension relief, even under tension on the cable lead 12 led out from the sensor head 4 and/or on the leadframe 24. Even if the leadframe 24 is provided with a contact connector for the connection to the systems of a motor vehicle, tensile and compressive loading in the longitudinal direction of the leadframe 24 may occur during servicing work and/or an exchange, such loading being kept away from the sensor unit 5 by the shaping of the fixing aid 28.

Figure 3:
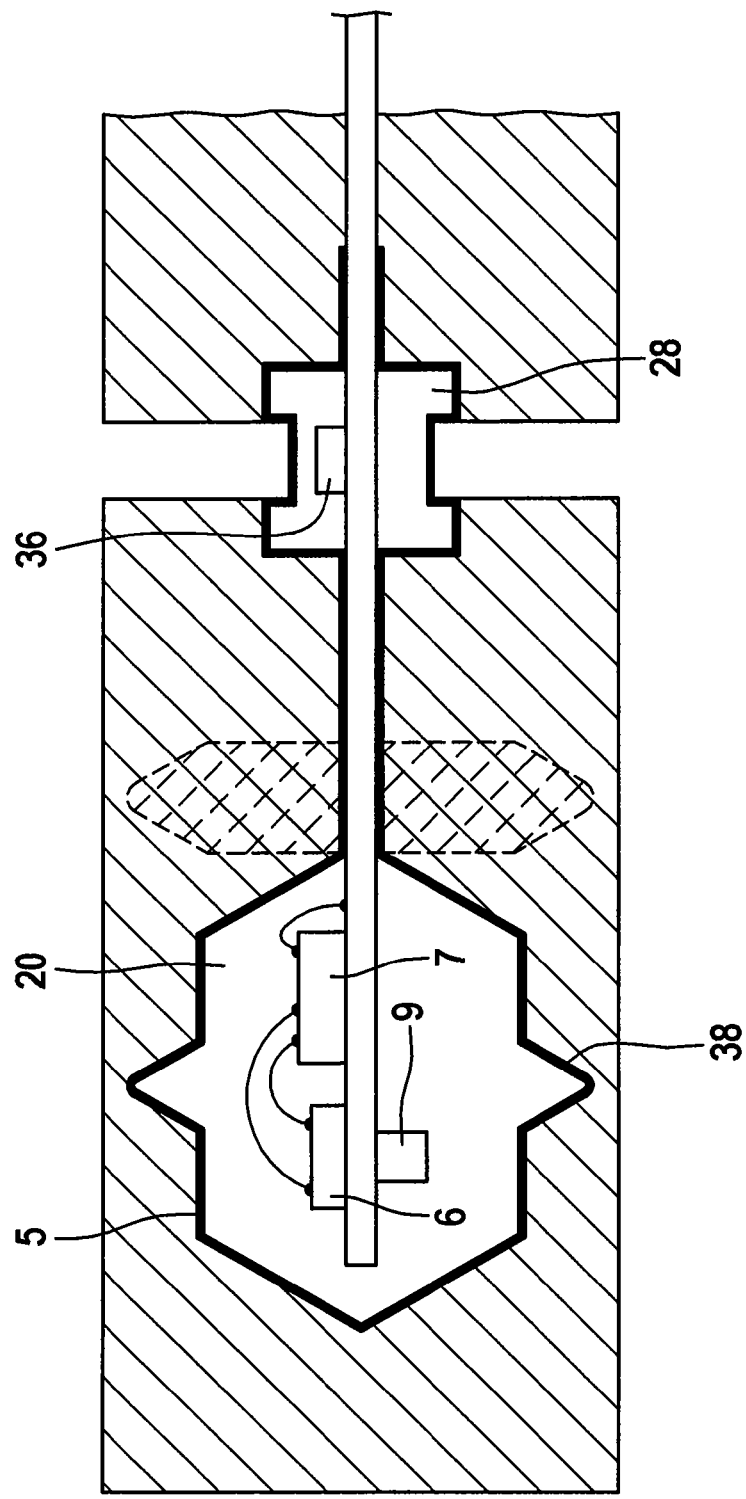
FIG. 3 shows an alternative arrangement of the elements in section.

FIG. 3 shows an arrangement of the components that is an alternative to the arrangement shown in FIG. 2, further embodiments and forms of arrangement being conceivable.

Figure 4:
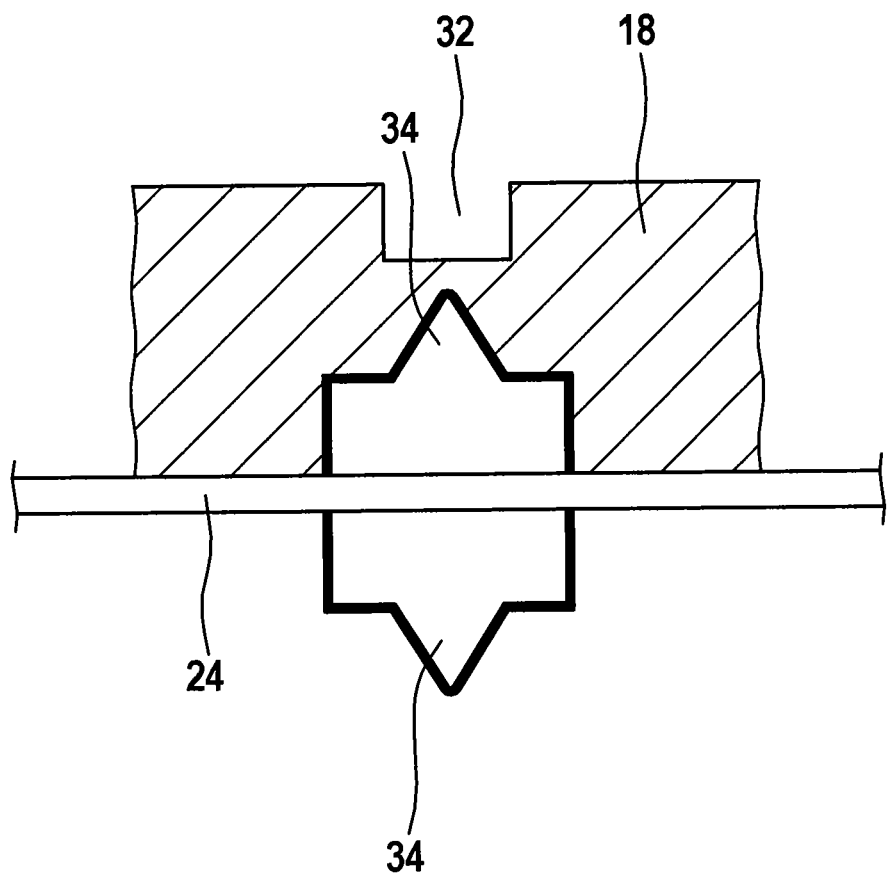
FIG. 4 shows alternative fixing of the leadframe in section.

In FIG. 4, a fixing aid 34 for arrangement on the leadframe 24 that is an alternative to the fixing aid 28 is described. Elevations 32 are provided in the encapsulating mold, with the effect of creating a clearance in the encapsulation 18 during encapsulation. The fixing aids 34 represented in FIG. 4 ensure that the elevations 32 of the encapsulating mold have the effect that the leadframe 24, and consequently the sensor unit 5, is positioned and held exactly in position transversely in relation to the longitudinal direction of the leadframe 24 during the encapsulating operation.

Figure 5:
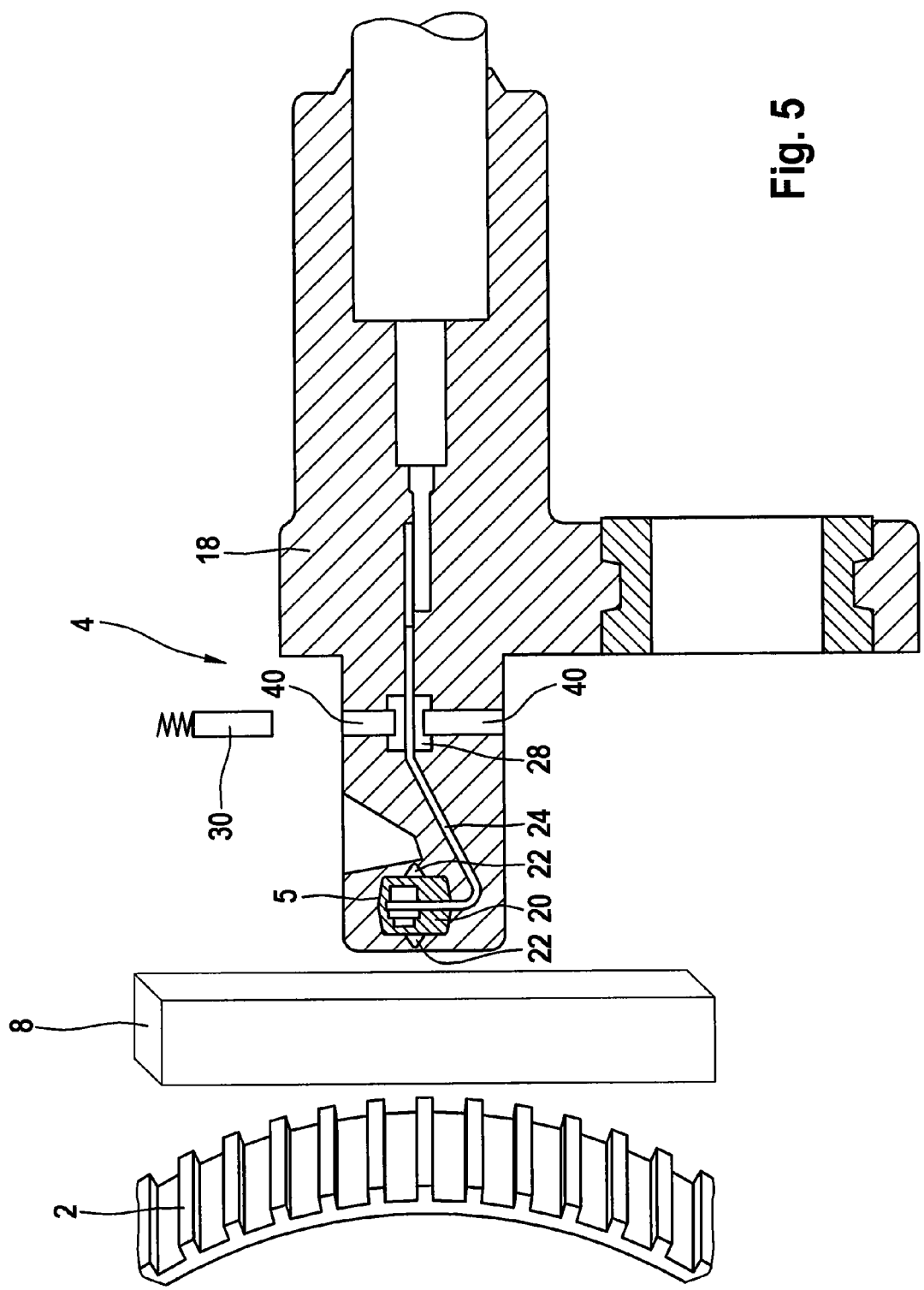
FIG. 5 shows the wheel speed sensor with the sensor head in section.

FIG. 5 schematically represents the interplay of the individual elements. The sensor head 4 is positioned in such a way that it is separated from the encoder 2 by a suitably dimensioned air gap 8. The sensor unit 5 is suitably positioned on the capsule housing by means of the fixing aids 22. The fixing aids 28 on the leadframe 24 ensure both positionally exact positioning in the production process and tension relief on the finished component.

However, after withdrawal of the mold pins 30 from the encapsulation 18, a leakage point could now occur at the contact locations between the fixing aid 28 and the mold pins 30. Therefore, sealing should be achieved for said contact locations by coating of the sensor unit 5. In the event that this coating does not achieve sealing, the openings 40 produced by the means for leading the mold pins 30 should be closed by a suitable measure.

The invention claimed is:

1. A sensor unit comprising
  at least one magnetic field sensor element,
  at least one application specific integrated circuit and
  at least one magnet on at least one leadframe,
  wherein the at least one magnetic field sensor element, the at least one application specific integrated circuit and the at least one magnet are arranged in a capsule housing surrounded by a sensor encapsulation, and wherein the capsule housing has a number of fixing aids adapted in their outer dimensions to an injection mold assigned to the sensor encapsulation, at least one of the fixing aids retains its original form in the sensor encapsulation and is completely surrounded by the sensor encapsulation, and
  wherein the fixing aids are configured to ensure exact positioning of the sensor element by supporting themselves in the mold of the sensor encapsulation.

2. The sensor unit as claimed in claim 1, wherein the fixing aids thereof are formed on the capsule housing.

3. The sensor unit as claimed in claim 1, wherein the fixing aids thereof are placed against the capsule housing in the manner of pairs of shells.

4. The sensor unit as claimed in claim 1, wherein the fixing aids thereof are adhesively attached to the capsule housing in the manner of pairs of shells.

5. The sensor unit as claimed in claim 1, wherein a number of fixing aids not connected to the capsule housing or arranged on the latter are arranged on at least one leadframe leading into the capsule housing.

6. The sensor unit as claimed in claim 5, wherein coating of a number of fixing aids is provided.

7. The sensor unit as claimed in claim 6, wherein the same material as for the sensor encapsulation is provided as the material for the coating of the fixing aids.

8. The sensor unit as claimed in claim 1, wherein the fixing aids thereof are elastically configured.

9. The sensor unit as claimed in claim 1, wherein a compression and/or tension relief is arranged on a leadframe leading into the capsule housing.

10. The sensor unit as claimed in claim 9, wherein the tension and compression relief thereof is arranged in the direction of the X axis.

11. The sensor unit as claimed in claim 1, wherein a compression and/or tension relief is arranged on one or more of the fixing aids.

12. The sensor unit as claimed in claim 1, wherein coating of the capsule housing is provided.

13. The sensor unit as claimed in claim 12, wherein the same material used for the sensor encapsulation is provided as the material for the coating of the capsule housing.

14. The sensor unit as claimed in claim 1, wherein an outer end of at least one of the fixing aids is spaced apart from a delimitation of the encapsulation.

* * * * *